United States Patent
Tashiro et al.

(10) Patent No.: US 8,038,428 B2
(45) Date of Patent: Oct. 18, 2011

(54) MANUFACTURING APPARATUS OF FIBER-REINFORCED RESIN STRAND

(75) Inventors: Naoyuki Tashiro, Takasago (JP); Katsumi Ogawa, Takasago (JP)

(73) Assignee: Kobe Steel, Ltd., Kobe-shi (JP)

( * ) Notice: Subject to any disclaimer, the term of this patent is extended or adjusted under 35 U.S.C. 154(b) by 145 days.

(21) Appl. No.: 12/518,428

(22) PCT Filed: Dec. 19, 2007

(86) PCT No.: PCT/JP2007/074403
§ 371 (c)(1),
(2), (4) Date: Dec. 3, 2009

(87) PCT Pub. No.: WO2008/078621
PCT Pub. Date: Jul. 3, 2008

(65) Prior Publication Data
US 2010/0136155 A1    Jun. 3, 2010

(30) Foreign Application Priority Data

Dec. 26, 2006  (JP) .................................. 2006-350024

(51) Int. Cl.
*B29C 53/14* (2006.01)
(52) U.S. Cl. ........ 425/182; 425/321; 425/322; 425/366; 425/367; 425/391
(58) Field of Classification Search .................. 425/182, 425/193, 321, 322, 334, 366, 367, 391
See application file for complete search history.

(56) References Cited

U.S. PATENT DOCUMENTS

| | | | | | |
|---|---|---|---|---|---|
| 3,698,986 | A | * | 10/1972 | Okmura | 425/366 |
| 4,124,348 | A | * | 11/1978 | Fischer | 425/321 |
| 5,139,403 | A | * | 8/1992 | Stuart | 425/391 |
| 7,850,888 | B2 | * | 12/2010 | Lipson | 425/322 |

FOREIGN PATENT DOCUMENTS

| | | |
|---|---|---|
| JP | 5-169445 | 7/1993 |
| JP | 2003-175512 | 6/2003 |
| WO | 2007-125792 | 11/2007 |

* cited by examiner

*Primary Examiner* — James Mackey
(74) *Attorney, Agent, or Firm* — Oblon, Spivak, McClelland, Maier & Neustadt, L.L.P.

(57) ABSTRACT

A manufacturing apparatus of a fiber-reinforced resin strand including a roller offset angle adjusting device which can easily adjust roller offset angles of a pair of twisting rollers for twisting a fiber-reinforced resin strand, the device being simple in structure. An offset angle of a first twisting roller can be adjusted by only rotating a first shaft roller support member in the roller offset angle adjusting device of the manufacturing apparatus of a fiber-reinforced resin strand around the axis of a first driving shaft which is orthogonal to a first roller support shaft of the first twisting roller. Likewise, an offset angle of a second twisting roller can be adjusted by only rotating a second shaft roller support member around the axis of a second driving shaft which is orthogonal to a second roller support shaft of the second twisting roller.

10 Claims, 6 Drawing Sheets

MANUFACTURING APPARATUS OF FIBER-REINFORCED RESIN STRAND

TECHNICAL FIELD

The present invention relates to an improvement of a manufacturing apparatus of a fiber-reinforced resin strand, and more particularly to a manufacturing apparatus of a fiber-reinforced resin strand which can easily adjust an offset angle of a pair of twisting rollers for twisting a fiber-reinforced resin strand and which is equipped with a roller offset angle adjusting device of a simple structure.

BACKGROUND ART

As techniques according to a related art relating to a manufacturing apparatus of a fiber-reinforced resin strand, for example, configurations described below are known. To begin with, a manufacturing apparatus of a fiber-reinforced resin strand according to a first related art example will be described with reference to FIG. 4 which is a schematic view to explain the configuration of this apparatus. The manufacturing apparatus of a fiber-reinforced resin strand according to the first related art example is configured to efficiently manufacture a fiber-reinforced resin strand having high adhesion between a reinforcing fiber and resin.

To be more specific, spreaders 8 that spread a reinforcing fiber bundle are provided inside a crosshead 5 into which a molten resin material 2 is continuously supplied from an extruding machine 6 by driving of a screw 7. In addition, at the exist side of the crosshead 5, a forming die 9, a cooler 10, twisting rollers (also referred to as cross roller capstans) 11 and 12, and pultruding rollers 13 are provided sequentially in this order from the exist side. According to the manufacturing apparatus of a fiber-reinforced resin strand thus configured, after reinforcing fibers 1, 1, . . . and so forth fed from bobbins 4, are soaked in a molten resin material 2 inside the crosshead 5 to be impregnated with resin, the sectional shape is determined by the forming die 9, after which they are cooled to harden by the cooler 10.

The twisting rollers 11 and 12 are rubber rollers and configured to be driven to rotate in directions opposite to each other. These twisting rollers 11 and 12 are provided so as to incline in directions opposite to each other on a horizontal plane. A fiber-reinforced resin strand 3 being pinched in the crossed portion of the twisting rollers 11 and 12 is pultruded in the direction indicated by an arrow so that the fiber-reinforced resin strand 3 can rotate about the shaft center in the longitudinal direction. The fiber-reinforced resin strand 3 is twisted on the way to the cooler 10 from the spreader 8 on the lowermost stream side owing to such rotations. The fiber-reinforced resin strand 3 thus twisted is cut into a predetermined length to manufacture pellets by a pelletizer 14 located remote from the pultruding rollers 13 in the crosshead 5 (see, for example, Patent Document 1).

A manufacturing apparatus of a continuous fiber-reinforced thermoplastic resin strand (hereinafter, referred to as a fiber-reinforced resin strand) according to a second related art example will be described briefly. In short, the manufacturing apparatus of a fiber-reinforced resin strand according to the second related art example is configured to be able to perform the manufacturing continuously over a long period when manufacturing the fiber-reinforced resin strand.

More specifically, it is an apparatus configured in such a manner that a reinforcing fiber bundle is introduced into molten thermoplastic resin inside a thermoplastic resin bath container (corresponding to the crosshead of the first related art example) to let the reinforcing fiber bundle be impregnated with the thermoplastic resin and a continuous fiber-reinforced thermoplastic resin strand is manufactured by pultruding a resin-impregnated fiber bundle from an exit nozzle of the thermoplastic resin bath container. Rollers that come into contact with a reinforcing fiber bundle are disposed inside the thermoplastic resin bath container so as to cross a traveling track of the reinforcing fiber bundle. Each roller is formed of a shaft and a tube, and the tube is supported around the shaft in a rotatable manner. In addition, means for retaining the twists of the fiber-reinforced resin strand imparted from twisting rollers that twist the fiber-reinforced resin strand is provided between the twisting rollers and a pelletizer (see, for example, Patent Document 2).

In the manufacturing apparatus of a fiber-reinforced resin strand according to related art, a pair of twisting rollers is inclined in different directions, that is, offset angles are imparted thereto, and the strand is pulled while twisting the strand between opposed outer peripheries of the pair of twisting rollers. But in certain operating conditions, it is necessary to adjust the offset angle of each of the paired twisting rollers. A roller offset angle adjusting device for adjusting offset angles of a pair of twisting rollers in such manufacturing apparatus of a fiber-reinforced resin strand according to a related art is configured for example as follows. Two examples of roller offset angle adjusting devices in the manufacturing apparatus of a fiber-reinforced resin strand will be explained below while taking, as an example, a case of adjusting offset angles of the twisting rollers 11 and 12 in the manufacturing apparatus of a fiber-reinforced resin strand according to the foregoing first related art example, with reference to a schematic view for explaining the configuration which shows the main part of the roller offset angle adjusting device.

First, the roller offset angle adjusting device in the manufacturing apparatus of a fiber-reinforced resin strand according to a first example will be described while making reference successively to FIG. 5(a) as seen from a strand moving direction side and FIG. 5(b) as seen in the direction of arrow B in FIG. 5(a). In the roller offset angle adjusting device according to the first example, the first twisting roller 11 is configured so that an angle $\theta_1$ between a rotational center $R_{c1}$ of the first twisting roller 11 and a horizontal line $L_H$ is adjusted by first offset angle adjusting means (not shown) together with a first motor 71 with reduction gear which drives the first twisting roller 11 to rotate. The second twisting roller 12 is configured so that an angle $\theta_2$ between a rotational center $R_{c2}$ of the second twisting roller 12 and the horizontal line $L_H$ is adjusted by second offset angle adjusting means (not shown) together with a second motor 72 with reduction gear which drives the second twisting roller 12 to rotate. The reference numeral 73 denotes a strand and the numeral 74 denotes a strand pass line.

Next, the roller offset angle adjusting device in the manufacturing apparatus of a fiber-reinforced resin strand according to the second example will be described while making reference successively to FIG. 6(a) as seen from a strand moving direction, and FIG. 6(b) as seen in the direction of arrow C in FIG. 6(a). In the roller offset angle adjusting device according to this second example, an expansion joint 81b whose length can be adjusted axially, is connected to an opposite side of a roller shaft 81a of a first twisting roller 11 with respect to the roller 11, the shaft 81a being inclined at an angle of $\theta 1$ relative to a horizontal line $L_H$. A universal joint 81c is connected to the expansion joint 81b. And the universal joint 81c is also connected to an expansion joint 81d, the expansion joint 81d being adjustable in length and connected to an end portion of a first driving shaft 81e which is rotated by a motor 83 via a belt 84 and a pulley 81f.

On the other hand, an expansion joint 82b whose length can be adjusted axially, is connected to an opposite side of a roller shaft 82a of a second twisting roller 12 facing the first twisting roller 11, with respect to the roller 12. The roller shaft 82a is inclined at an angle of $\theta_2$ relative to the horizontal line $L_H$. A universal joint 82c is connected to the expansion joint 82b. And the universal joint 82c is also connected to an expansion joint 82d, the expansion joint being adjustable in length and connected to an end portion of a second driving shaft 82e which is rotated by the motor 83 via the belt 84 and a pulley 82f. Further, an idler pulley (not shown), whose rotational center position is changed as necessary, is provided for the belt 84 to cope with a change in spacing between the pulleys 81f and 82f.

Thus, according to the roller offset angle adjusting device of the second example, the offset angle $\theta1$ of the first twisting roller 11 is adjusted by an expanding/contracting operation of the length-adjustable expansion joints 81b and 81d, while the offset angle $\theta2$ of the second twisting roller 12 is adjusted by an expanding/contracting operation of the length-adjustable expansion joints 82b and 82d. The reference numeral 85 denotes a strand, and the numeral 86 denotes a strand pass line.

According to the general roller offset angle adjusting devices of the above two examples in the manufacturing apparatus of a fiber-reinforced resin strand according to related art, the offset angle adjusting operations for the twisting rollers are very complicated, the roller spacing adjusting operations for the twisting rollers performed in response to a change in strand diameter are also complicated, and the devices' structures are complicated. Besides, an increase in size is unavoidable. There have been such problems to be solved. More particularly, in the roller offset angle adjusting device of the first example, in addition to the necessity of synchronized driving of two motors with reduction gear, the motors with reduction gear must be moved during roller offset angle adjustment and roller spacing adjustment. As a result, it is inevitable for the angle adjusting means to become large-sized and complicated in configuration. In the roller offset angle adjusting device of the second example, it is necessary to use universal joints, thus inevitably resulting in that the driving shaft system for driving the first and second twisting rollers become long. In addition, the roller spacing adjustment for the twisting rollers requires movement of each driving shaft system. Consequently, the angle adjusting means become large-sized and complicated, and the roller offset angle adjustment and the roller spacing adjustment for the twisting rollers also become complicated.

[Patent Literature 1]
Japanese Patent Laid-Open Publication No. Hei 5 (1993)-169445

[Patent Literature 2]
Japanese Patent Laid-Open Publication No. 2003-175512

DISCLOSURE OF THE INVENTION

Accordingly, it is an object of the present invention to provide a manufacturing apparatus of a fiber-reinforced resin strand equipped with a roller offset angle adjusting device, the roller offset angle adjusting device being able to easily adjust roller offset angles of a pair of twisting rollers for twisting a fiber-reinforced resin strand and being simple in structure.

For solving the above problem, the means adopted in a manufacturing apparatus of a fiber-reinforced resin strand according to the present invention, is characterized in that, a manufacturing apparatus of a fiber-reinforced resin strand having a first twisting roller and a second twisting roller, the first and second twisting rollers being provided in front of a crosshead and opposed to each other for twisting a fiber-reinforced resin strand drawn out from an exit nozzle of the crosshead, the apparatus comprising a body frame; a first support member being mounted to the body frame rotatably, for supporting both a first support shaft for supporting the first twisting roller rotatably, and a first driving shaft being orthogonal to the first support shaft and functioning to impart power to the first twisting roller; and a second support member mounted to the body frame and supporting the second twisting roller rotatably about a second support shaft, the first and second support shafts being disposed respectively on two reference planes substantially parallel to each other, the first driving shaft being disposed substantially perpendicularly to the reference planes, and the first support member being rotatable coaxially with the first driving shaft relative to the body frame.

The manufacturing apparatus of a fiber-reinforced resin strand according to the present invention is configured so that an offset angle of the first twisting roller can be adjusted by only rotating the first support member about the axis of the first driving shaft which is orthogonal to the first support shaft of the first twisting roller. Therefore, all that is required for adjusting offset angles of the first and second twisting rollers is only rotating the first support member about the axis of the first driving shaft. Thus, the offset angle adjusting operation for the first and second twisting rollers is simple and so is the configuration for the adjustment. Accordingly, it is easy to reduce the size of the manufacturing apparatus of a fiber-reinforced resin strand.

BRIEF DESCRIPTION OF THE DRAWINGS

FIG. 3 relates to a third embodiment of the present invention, in which

BEST MODE FOR CARRYING OUT THE INVENTION

Figure 1:
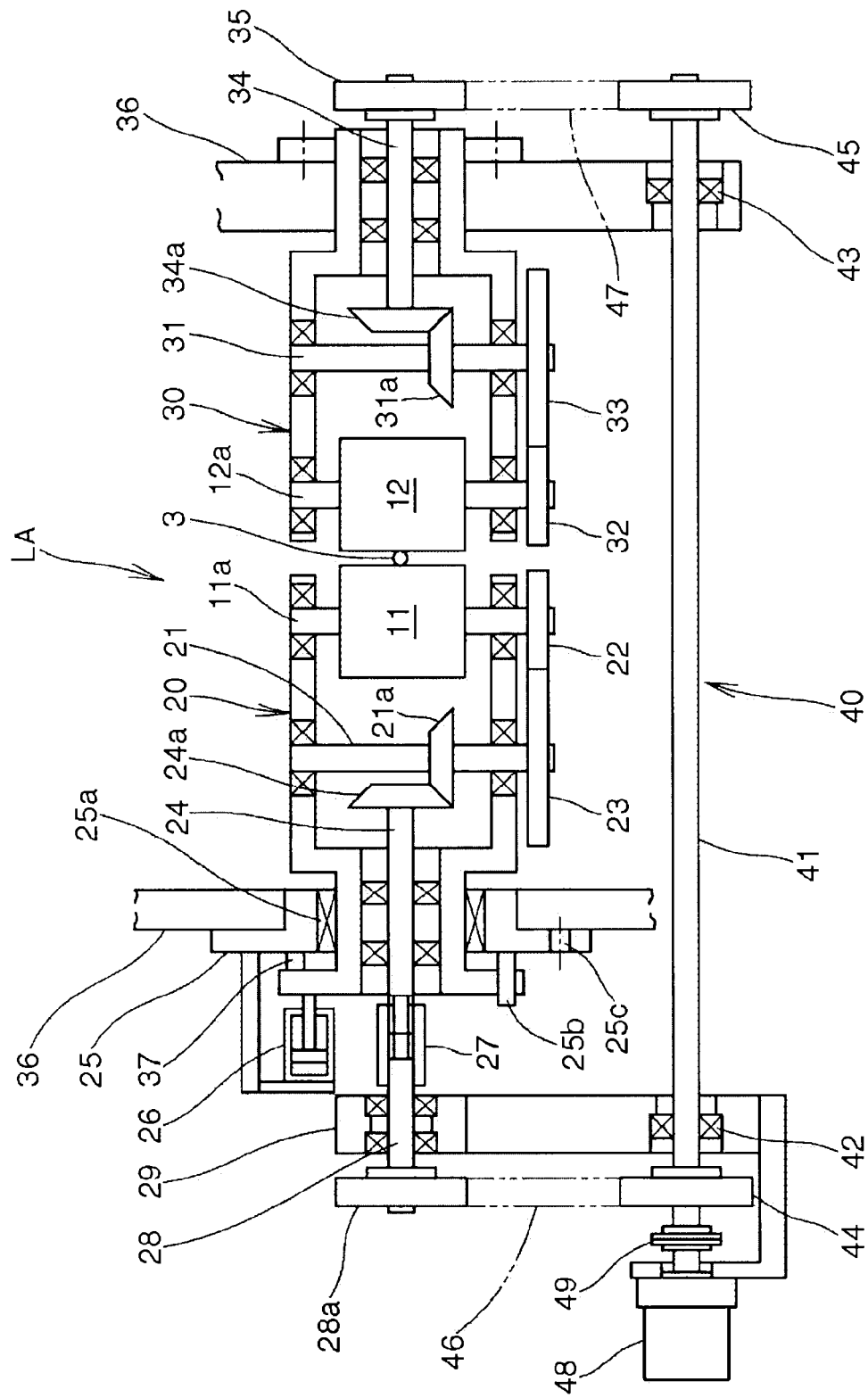
FIG. 1 illustrates schematically the configuration of a roller offset angle adjusting device (showing a state free from a twisting roller offset angle displacement) in a manufacturing apparatus of a fiber-reinforced resin strand according to a first embodiment of the present invention.

A manufacturing apparatus of a fiber-reinforced resin strand according to a first embodiment of the present invention will be described with reference to the accompanying drawings. FIG. 1 illustrates schematically the configuration of a roller offset angle adjusting device (showing a state free from a twisting roller offset angle displacement) in the manufacturing apparatus of a fiber-reinforced resin strand according to the first embodiment. The manufacturing apparatus of a fiber-reinforced resin strand according to this first embodiment is approximately the same configuration as that of the manufacturing apparatus of a fiber-reinforced resin strand according to the above first related art example except that a pair of twisting rollers used herein are metallic rollers and that there is used such a roller offset angle adjusting device as defined herein. Therefore, the following description will cover only the roller offset angle adjusting device different in configuration.

The reference mark $L_A$ shown in the drawings denotes the roller offset angle adjusting device used in the manufacturing apparatus of a fiber-reinforced resin strand according to the first embodiment. The roller offset angle adjusting device $L_A$ includes a first shaft • roller support member 20 for supporting a first roller support shaft 11a of a first twisting roller 11 through bearings, and a second shaft • roller support member 30 for supporting a second roller support shaft 12a of a second twisting roller 12 through bearings. A concrete description will be given below about the first shaft • roller support member 20, the second shaft • roller support member 30 and an incidental configuration in the roller offset angle adjusting device $L_A$ of the manufacturing apparatus of a fiber-reinforced resin strand.

The first shaft • roller support member 20 is secured to an angle adjusting member 25 which is fitted in an angle adjustable manner into a hole formed in one left-hand bracket portion of a body frame 36 in FIG. 1. More specifically, the first shaft • roller support member 20 is fitted in a sleeve 25a so as to be slidable in the axial direction of the first driving shaft 24, the sleeve 25a being fitted in a circular hole formed in the angle adjusting member 25. On the left side of the first twisting roller 11 of the first shaft • roller support member 20 in FIG. 1, a bevel gear shaft 21 with a bevel gear 21a fitted thereon is supported through bearings in parallel with the first roller support shaft 11a. A small spur gear 22 is fitted on an end portion of the first roller support shaft 11a, and a large spur gear 23 meshing with the spur gear 22 is fitted on an end portion of the bevel gear shaft 21 to transmit rotation of the bevel gear shaft 21 to the first roller support shaft 11a.

The first driving shaft 24 is supported through bearings at the end side of a supported side of the first shaft • roller support member 20 supported by the angle adjusting member 25. A bevel gear 24a meshing with the bevel gear 21a of the bevel gear shaft 21 is fitted on one end of the first driving shaft 24. And the first driving shaft 24 is disposed in a direction orthogonal to both first roller support shaft 11a and bevel gear shaft 21, and has a rotational center which shares the same axis with a rotational center of the first shaft • roller support member 20. A pin 25b formed on an end surface of the angle adjusting member 25 for inhibiting rotation of the first shaft • roller support member 20, passes through a pin hole formed in a flange portion formed at an end of the first shaft • roller support member 20. The first shaft • roller support member 20 is configured so as to be advanced and retreated in rotational axis direction (the axial direction of the first driving shaft 24) by an expanding/retracting operation of an expansion rod of an air cylinder 26 supported by bracket which is provided at an end surface of the angle adjusting member 25.

The axis passing through a radial center of the angle adjusting member 25 shares the same axis with the rotational center of the first shaft • roller support member 20. The angle adjusting member 25 is rotated about the said same axis as its rotational center and is clamped with a bolt at an arbitrary position of an elongated hole 25c which is bored through the angle adjusting member 25 in an arc shape which is concentric with the aforesaid same axis, the bolt being passed through the elongated hole 25c and screwed into a screw hole (not shown) formed in the body frame 36. The angle adjusting member 25 is configured so that its rotational angle is checked visually by an angle dial plate (not shown).

An opposite end of the first driving shaft 24 projects from an end of the first shaft • roller support member 20, and the projecting end of the shaft 24 is splined. A spline joint 27 is fitted on the splined projecting end of the first driving shaft 24, the spline joint 27 being configured so that an axial engaging position thereof is adjustable. One end side of a driving base shaft 28 which is supported by a bearing boss 29 through bearings is connected to an opposite end of the spline joint 27, the bearing boss 29 being installed so that the position thereof relative to the body frame 36 is fixed. A first driven timing belt pulley 28a is fitted on the opposite side of driving base shaft 28 with respect to the spline joint 27, and the first driven timing belt pulley 28a is driven to rotate by a driving force transfer mechanism 40 of a configuration to be described later.

The second shaft • roller support member 30 is fitted in an angle adjustable manner in a circular hole formed in one right-hand bracket portion of the body frame 36 in FIG. 1. On the right side of the second twisting roller 12 of the second shaft • roller support member 30 in FIG. 1, a bevel gear shaft 31 with a bevel gear 31a fitted thereon is supported through bearings in parallel with the second roller support shaft 12a. A small spur gear 32 is fitted on an end portion of the second roller support shaft 12a, and a large spur gear 33 meshing with the spur gear 32 is fitted on an end portion of the bevel gear shaft 31 to transfer rotation of the bevel gear shaft 31 to the second roller support shaft 12a.

The second driving shaft 34 is supported through bearings at the end side of a supported side of the second shaft • roller support member 30 supported by the bracket portion. A bevel gear 34a meshing with the bevel gear 31a of the bevel gear shaft 31 is fitted on one end of the second driving shaft 34. And the second driving shaft 34 is disposed in a direction orthogonal to both second roller support shaft 12a and bevel gear shaft 31, and has a rotational center which shares the same axis with a rotational center of the second shaft • roller support member 30. The second driving shaft 34 is configured such that a second driven timing belt pulley 35 fitted on a projecting end of the second driving shaft 34 projecting from the second shaft • roller support member 30, is driven to rotate by the driving force transfer mechanism 40 which will be described below. The second shaft • roller support member 30 is rotated about the aforesaid same axis as its rotational center, but the rotational angle of the second shaft • roller support member 30 can be adjusted and its position can be fixed as similarly as the angle adjusting member 25, and the rotational angle is checked visually by an angle dial plate (not shown). The first roller support shaft 11a and the second roller support shaft 12a are disposed on planes (hereinafter referred to as the "reference planes") parallel to each other with the fiber-reinforced resin strand 3 therebetween respectively, the reference planes being orthogonal to the aforesaid same axis.

The driving force transfer mechanism 40 includes a rotating shaft 41. The rotating shaft 41 is supported by bearings 42 and 43 spaced apart with a predetermined distance so that the position relative to the body frame is fixed, and is rotated by a drive motor 48 in the vicinity of its left end portion in FIG. 1, the drive motor 48 having an output shaft connected to the rotating shaft 41 through a coupling 49 of a known configuration. A first driving timing belt pulley 44 for driving the first twisting roller 11 is fitted on a projecting end of the rotating shaft 41 projecting from the left-hand bearing 42 between the left-hand bearing 42 and the coupling 49, in FIG. 1.

A second driving timing belt pulley 45 for driving the second twisting roller 12 is fitted on a projecting end of the rotating shaft 41 projecting from the right-hand bearing 43 in FIG. 1. A first timing belt 46 is wound on both the first driving timing belt pulley 44 and the first driven timing belt pulley 28*a*, further, a second timing belt 47 is wound on both the second driving timing belt pulley 45 and the second driven timing belt pulley 35.

The following description is now provided about an operation mode of the roller offset angle adjusting device $L_A$ in the manufacturing apparatus of a fiber-reinforced resin strand according to this first embodiment. When the driving motor 48 is driven in order to rotate the first timing belt pulley 44 via the rotating shaft 41, the rotation of the first timing belt pulley 44 is transmitted to the first driven timing pulley 28*a* via the first timing belt 46, whereby the driving base shaft 28 is rotated. The rotation of the driving base shaft 28 is transmitted via the spline joint 27, first driving shaft 24, bevel gear 24*a*, bevel gear 21*a*, bevel gear shaft 21, large spur gear 23, small spur gear 22 and first roller support shaft 11*a* to the first twisting roller 11, so that the first twisting roller 11 is rotated.

Likewise, the rotation of the second timing belt pulley 45 which rotates via the rotating shaft 41 is transmitted to the second driven timing pulley 35 via the second timing belt 47, whereby the second driving shaft 34 is rotated. The rotation of the second driving shaft 34 is transmitted via the bevel gear 34*a*, bevel gear 31*a*, bevel gear shaft 31, large spur gear 33, small spur gear 32 and second roller support shaft 12*a* to the second twisting roller 12, so that the second twisting roller 12 is rotated. Consequently, the fiber-reinforced resin strand 3 which is traveling while being pinched between the first and second twisting rollers 11 and 12 can be twisted.

When the diameter or hardness of the fiber-reinforced resin strand to be manufactured, changes, it is necessary to change the spacing between the first and second twisting rollers 11 and 12, or a pressing force of both twisting rollers 11 and 12 against the fiber-reinforced resin strand in the manufacturing apparatus of a fiber-reinforced resin strand. In the case of the roller offset angle adjusting device $L_A$ of the manufacturing apparatus of a fiber-reinforced resin strand according to this first embodiment, the projecting end of the first driving shaft 24 projecting from the first shaft • roller support member 20, and the driving base shaft 28 fitted in the bearing boss 29 whose position is fixed relative to the body frame 36, are connected to each other through the spline joint 27 in such a manner that an engaging position of the first driving shaft 24 can be changed with respect to the spline joint 27 by an axial movement of the shaft 24.

The rotation of the first shaft • roller support member 20 is inhibited by the pin 25*b* relative to the angle adjusting member 25 which is provided for the body frame 36 through the sleeve 25*a* so as to rotate and be fixed to the body frame 36. Further, the first shaft • roller support member 20 is fitted in the angle adjusting member 25 so as to movable in the axial direction of the first driving shaft 24. Therefore, by an expanding/retracting operation of an expanding/retracting rod of the air cylinder 26, the first shaft • roller support member 20 can be easily moved toward and away from the second shaft • roller support member 30. In this first embodiment, moreover, a pressing force can be imparted by the air cylinder 26 to the first twisting roller 11 through the first shaft • roller support member 20. It is preferable that a length-adjustable stopper 37 be disposed between the first shaft • roller support member 20 and the angle adjusting member 25 lest the roller spacing should become narrower accidentally.

As described above, according to the roller offset angle adjusting device $L_A$ in the manufacturing apparatus of a fiber-reinforced resin strand according to the first embodiment, it is possible to adjust the roller spacing in accordance with the diameter of the fiber-reinforced resin strand 3 and it is also possible to adjust the pressing force against the fiber-reinforced resin strand 3 in accordance with hardness and the strength of pultruding force. Thus, it is possible to obtain an excellent effect that fiber-reinforced resin strand of various properties can be manufactured in a stable manner.

Moreover, in the roller offset angle adjusting device $L_A$ in the manufacturing apparatus of a fiber-reinforced resin strand according to the first embodiment, by rotating the angle adjusting member 25 to change its installation angle relative to the body frame 36, the installation angle of the first shaft • roller support member 20 can also be changed by the same angle as the angle adjusting member 25 through the pin 25*b*. Further, the installation angle of the second shaft • roller support member 30 relative to the body frame 36 can be changed easily by rotation thereof.

Thus, according to the roller offset angle adjusting device $L_A$ according to the first embodiment, an offset angle of the first twisting roller 11 and that of the second twisting roller 12 can be adjusted by only rotating the first shaft • roller support member 20 and the second shaft • roller support member 30 in confronting or opposite directions about the same axis to change the installation angle. That is, the offset angle of the first twisting roller 11 and that of the second twisting roller 12 can be adjusted in an extremely simple manner. Consequently, the configuration of the roller offset angle adjusting device $L_A$ itself is simple, permitting the reduction of size and hence facilitating the reduction in size of the manufacturing apparatus of a fiber-reinforced resin strand.

Additionally, in the roller offset angle adjusting device $L_A$ in the manufacturing apparatus of a fiber-reinforced resin strand according to the first embodiment, the first driving shaft 24 for rotating the first twisting roller 11, and the second driving shaft 34 for rotating the second twisting roller 12 are configured so as to be driven by the driving force transfer mechanism 40 which transmits the driving force of a single drive motor 48 to both rollers. Thus, it is not necessary to control to synchronize plural motors, nor is it necessary to adopt such an expensive motor as a servo motor. Besides, a universal joint is not needed and hence the driving shaft system does not become long in the axial direction of each roller support shaft.

Therefore, according to the roller offset angle adjusting device $L_A$ in the manufacturing apparatus of a fiber-reinforced resin strand according to the first embodiment, it is possible to reduce the apparatus size, and also with respect to the manufacturing cost, there is an advantage over the related arts.

Although reference has been made in the above first embodiment to an example in which the driving force transfer mechanism in the roller offset angle adjusting device is provided with timing belt pulleys and timing belts, no limitation is made thereto. For example, this driving force transfer mechanism may be substituted by a driving force transfer mechanism of a gear train configuration. More specifically, a bevel gear, instead of a timing belt pulley, is fitted on the projecting end of the driving base shaft 28, and a bevel gear, instead of a timing belt pulley, is fitted on the projecting end of the second driving shaft 34. Also on the rotating shaft 41, there are fitted bevel gears instead of timing belt pulleys, and the rotation of these bevel gears is transmitted via bevel gears to the bevel gear fitted on the projecting end of the driving base shaft 28 and also to the bevel gear fitted on the projecting end of the second driving shaft 34.

Figure 2:
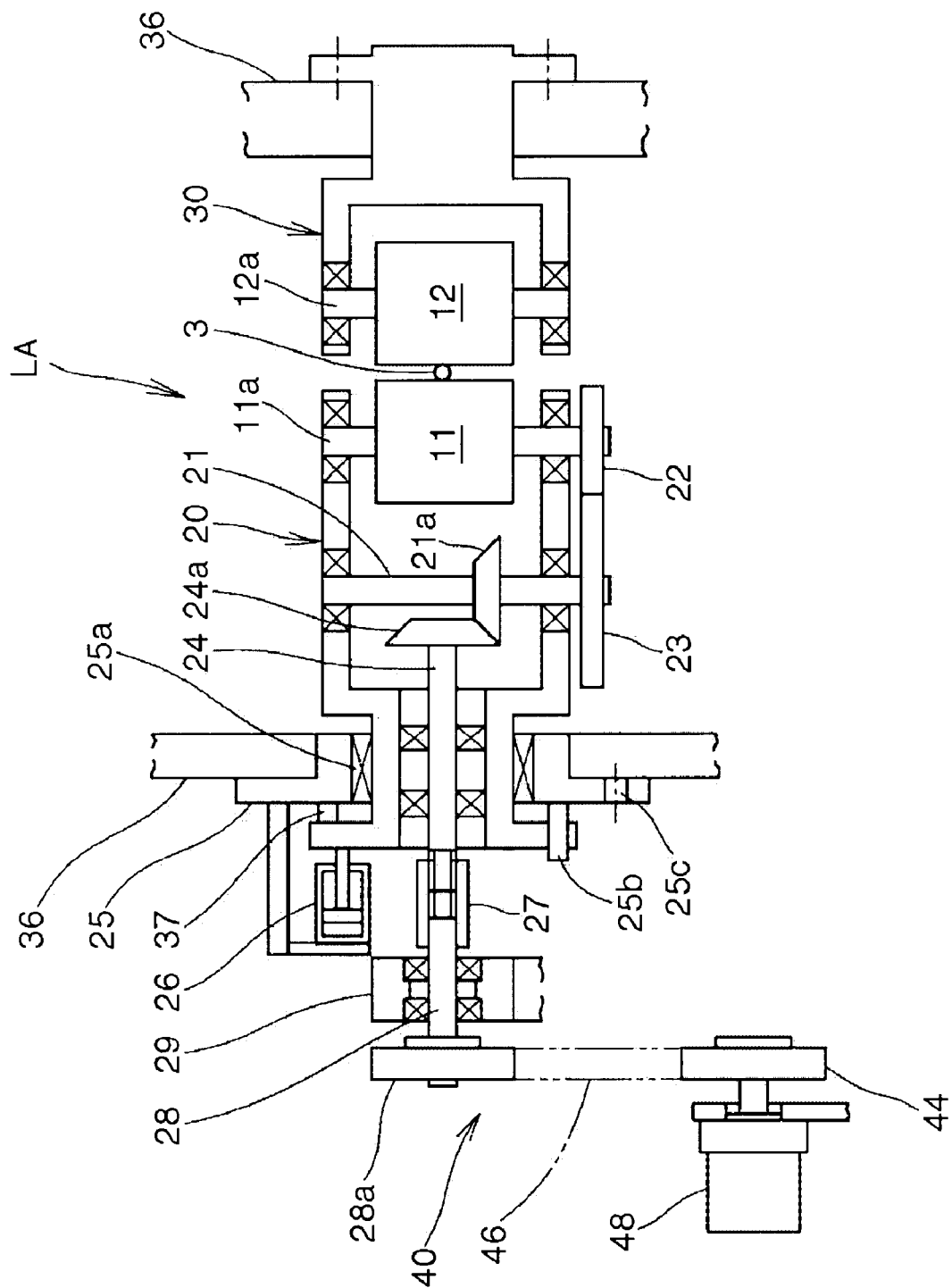
FIG. 2 illustrates schematically the configuration of a roller offset angle adjusting device (showing a state free from a twisting roller offset angle displacement) in a manufacturing apparatus of a fiber-reinforced resin strand according to a second embodiment of the present invention.

In the example shown in the above first embodiment, both first and second twisting rollers 11 and 12 are driven to rotate. However, no limitation is made to this configuration. There may be adopted such a structure as illustrated in FIG. 2. FIG. 2 illustrates schematically the configuration of a roller offset angle adjusting device (showing a state free from a twisting roller offset angle displacement) in a manufacturing apparatus of a fiber-reinforced resin strand according to a second embodiment of the present invention (the same portions and those having the same functions as in the first embodiment are identified by the same reference numerals as in the first embodiment). According to the configuration illustrated in FIG. 2, one twisting roller (the first twisting roller 11 in FIG. 2) is driven to rotate, while the other twisting roller (the second twisting roller 12 in FIG. 2) is rotated by the rotation of the one twisting roller. This configuration is disadvantageous in that the pultruding force of the twisting rollers for the fiber-reinforced resin strand becomes weaker, but there is an advantage that the structure of the roller offset angle adjusting device becomes still simpler. The driving force of the drive motor is transmitted to the twisting roller via the driving force transfer mechanism 40, but there may be adopted a modification such that the output shaft of the drive motor is connected to the driving base shaft 28 to transmit the driving force of the drive motor to the twisting roller without through the driving force transfer mechanism 40.

Figure 3A:
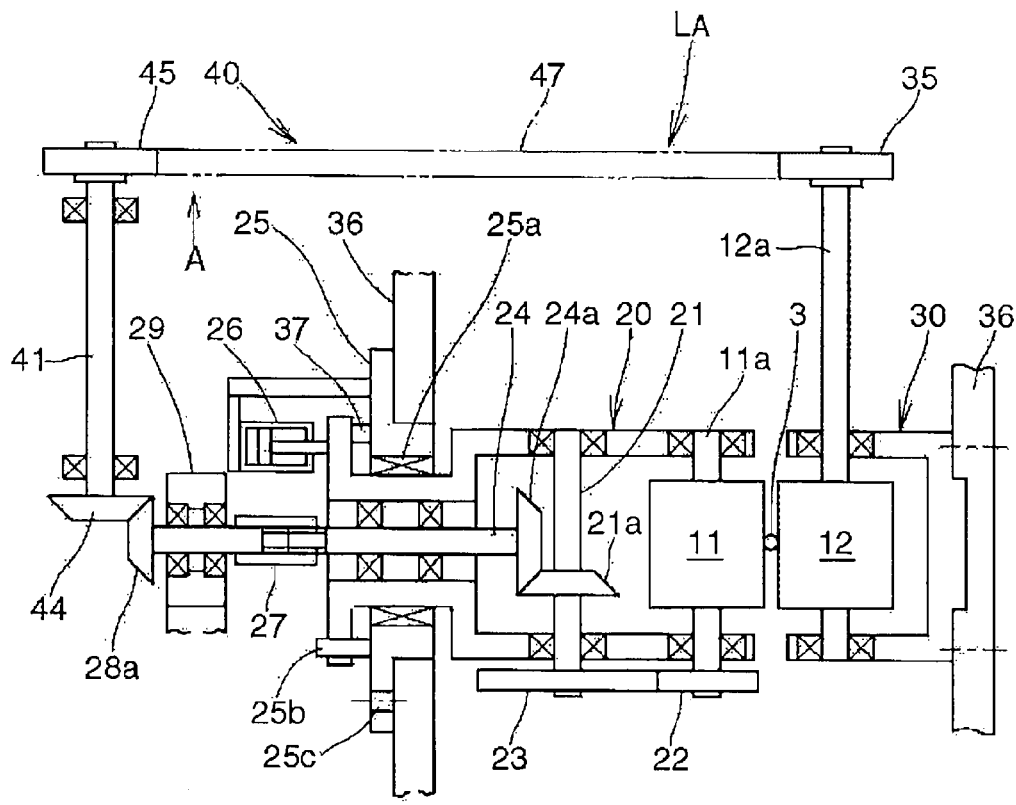
FIG. 3(a) illustrates schematically the configuration of a roller offset angle adjusting device (showing a state free from a twisting roller offset angle displacement) in a manufacturing apparatus of a fiber-reinforced resin strand.
Figure 3B:
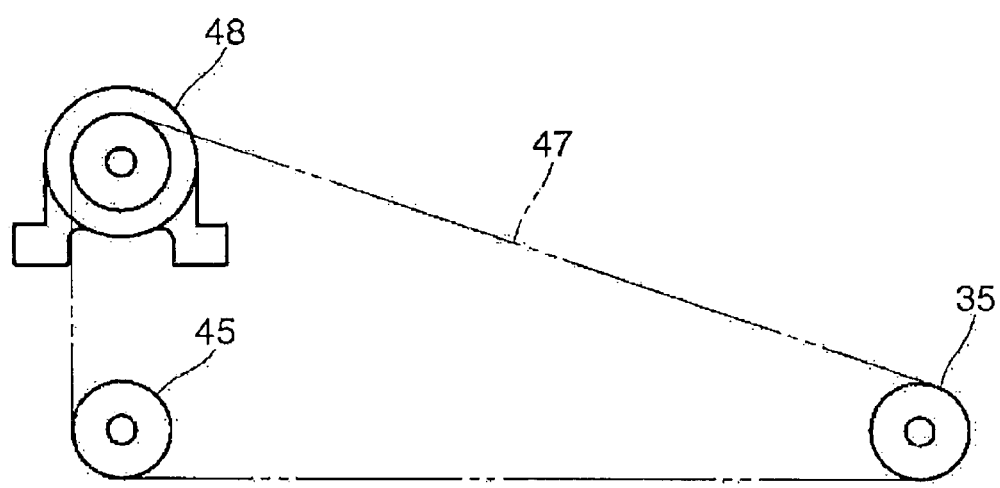
FIG. 3(b) is a view as seen in the direction of arrow A in FIG. 3(a).
Figure 4:
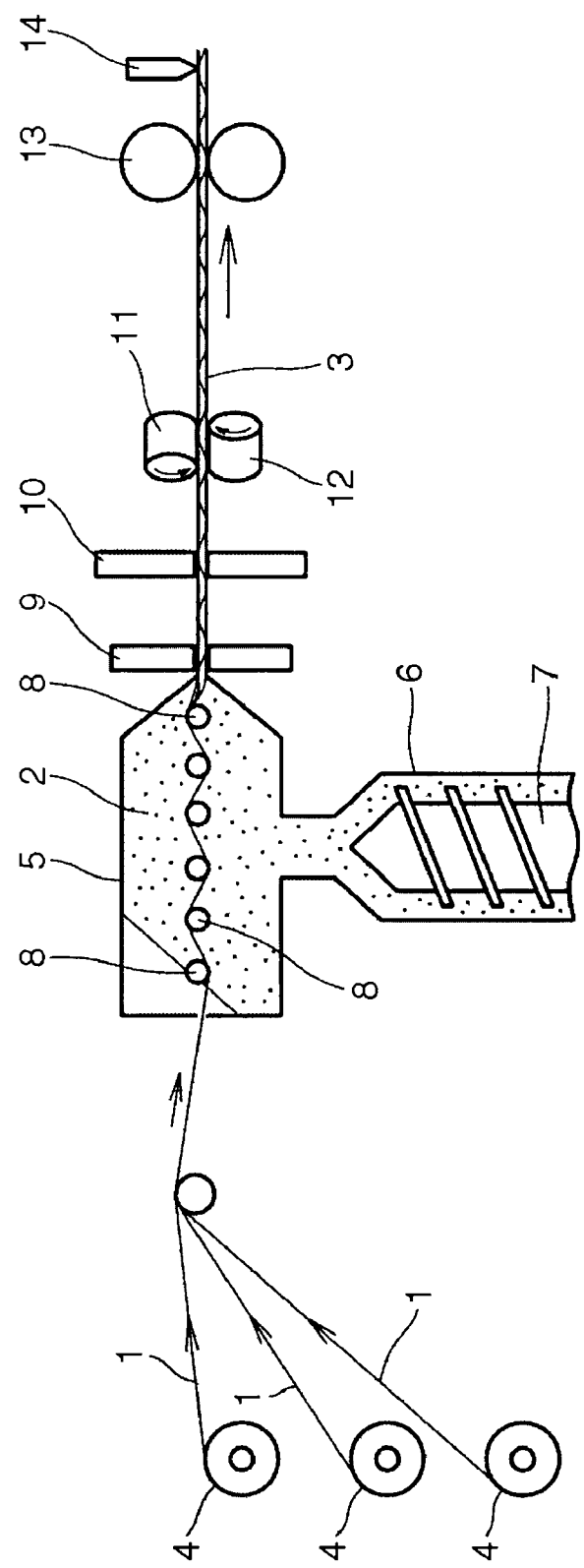
FIG. 4 illustrates schematically a configuration of a manufacturing apparatus of a fiber-reinforced resin strand according to a first related art example.
Figure 5A:
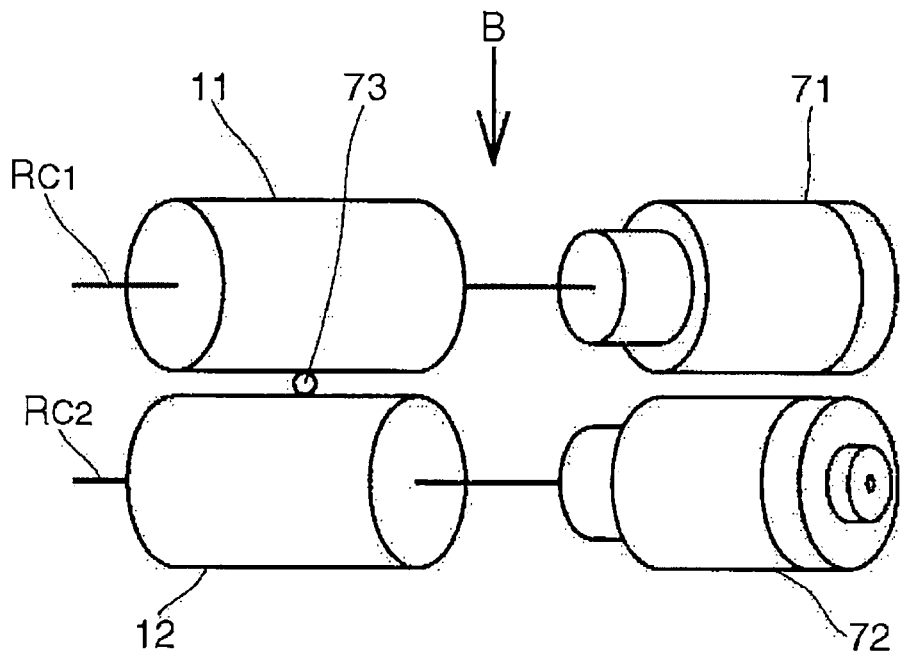
FIG. 5(a) illustrates a roller offset angle adjusting device according to the first example as seen from a strand moving direction side.
Figure 5B:
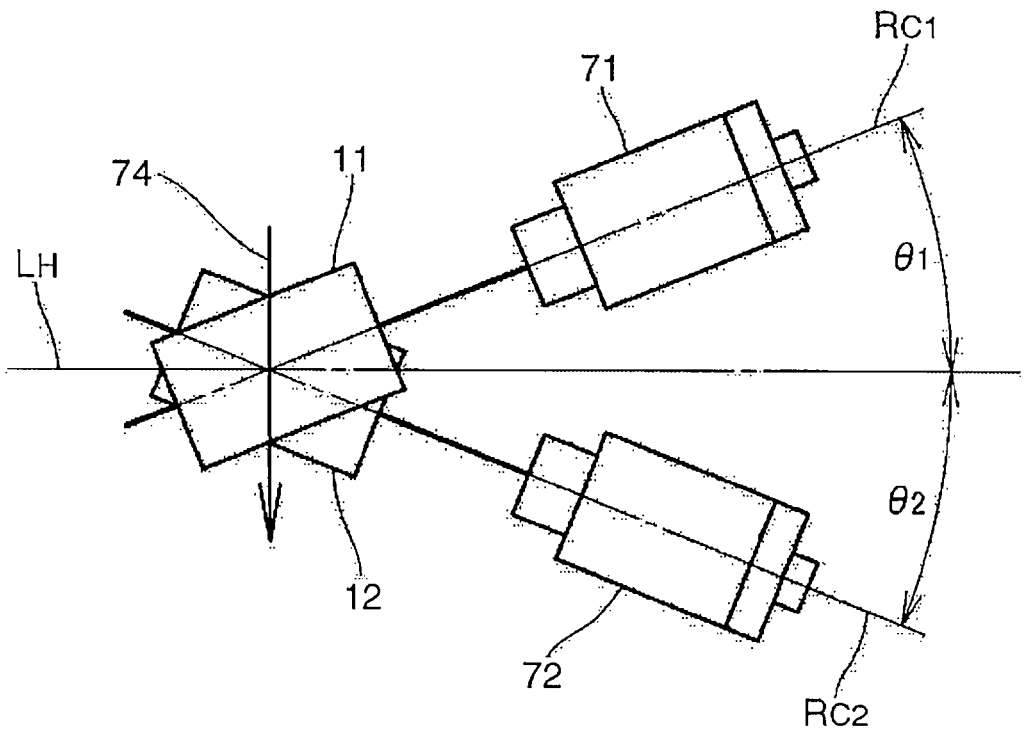
FIG. 5(b) is a view as seen in the direction of arrow B in FIG. 5(a).
Figure 6A:
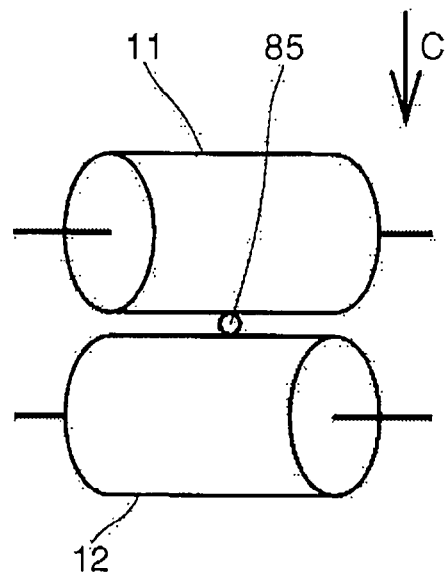
FIG. 6(a) illustrates a roller offset angle adjusting device according to a second example as seen from a strand moving direction side.
Figure 6B:
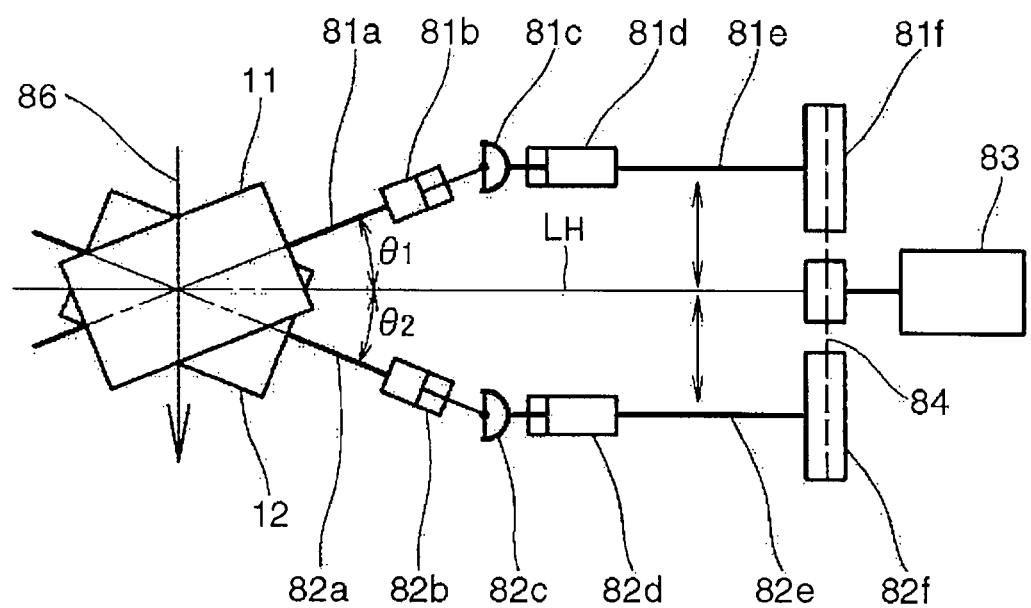
FIG. 6(b) is a view as seen in the direction of arrow C in FIG. 6(a).

In the above first embodiment reference has been made to an example in which the first shaft • roller support member 20 and the first driving shaft 24 share the same axis, and the second shaft • roller support member 30 and the second driving shaft 34 share the same axis. However, no limitation is made to this configuration. There may be adopted such a configuration as shown in FIGS. 3(*a*) and 3(*b*) which illustrate schematically the configuration of a roller offset angle adjusting device (showing a twisting roller displacement) in a manufacturing apparatus of a fiber-reinforced resin strand according to a third embodiment of the present invention (the same portions and those having the same functions as in the first embodiment are identified by the same reference numerals as in the first embodiment).

This roller offset angle adjusting device is configured so that one shaft • roller support member (the first shaft • roller support member 20 in FIG. 3) and one driving shaft (the driving shaft 24 in FIG. 3) share the same axis. Further, the other shaft • roller support member (the second shaft • roller support member 30 in FIG. 3) is fixed to the body frame. According to this configuration, the driving force is transmitted to the roller support shaft (the second roller support shaft 12*a* in FIG. 3) without through the other driving shaft (the second driving shaft 34 in FIG. 1), bevel gear train (the bevel gears 31*a* and 34*a* in FIG. 1), bevel gear shaft (the bevel gear shaft 31 in FIG. 21) and spur gear train (the large and small spur gears 32, 33 in FIG. 1). In this case, the other twisting roller is given a predetermined offset angle beforehand relative to the pass line of the fiber-reinforced resin strand, while the offset angle of one twisting roller is finely adjusted. If the offset angle is to be changed to a wider range, this can be done by finely adjusting the direction of the pass line with use of a strand guide (not shown) in addition to the aforesaid fine adjustment.

In the previous first and second embodiments reference has been made to an example in which the first twisting roller 11 is moved or pressed via the first shaft • roller support member 20 in the direction of the second shaft • roller support member 30 which supports the second twisting roller 12. However, no limitation is made to this configuration. There may be adopted a configuration wherein one of the first shaft • roller support member 20 and the second shaft • roller support member 30, (the first shaft • roller support member 20 in FIG. 3), imparts a pressing force in the direction of the other (the second shaft • roller support member in FIG. 3). Moreover, both shaft • roller support members 20 may be configured so that pressing forces are exerted in mutually facing directions. Although in the above embodiments, both roller spacing adjustment and the exertion of pressing force of the twisting roller on the fiber-reinforced resin strand are performed using the air cylinder 26, there may be used a hydraulic cylinder. There also may be adopted a configuration wherein the impartment of pressing force is performed using a spring and that the adjustment of roller spacing is performed using a screw jack (corresponding to the stopper 37). The manufacturing apparatus of a fiber-reinforced resin strand according to the above embodiments are mere concrete examples of the present invention, and design changes, etc. may be done freely within the scope not departing from the technical idea of the present invention. Thus, the configuration of the roller offset angle adjusting device is not limited to the configurations according to the above first to third embodiments.

That is, the means adopted in an manufacturing apparatus of a fiber-reinforced resin strand according to the present invention is characterized in that a manufacturing apparatus of a fiber-reinforced resin strand, having a first twisting roller and a second twisting roller, the first and second twisting rollers being provided in front of a crosshead and opposed to each other for twisting a fiber-reinforced resin strand drawn out from an exit nozzle of the crosshead, the apparatus comprising a body frame; a first support member being mounted to the body frame rotatably, for supporting both a first support shaft for supporting the first twisting roller rotatably, and a first driving shaft being orthogonal to the first support shaft and functioning to impart power to the first twisting roller; and a second support member mounted to the body frame and supporting the second twisting roller rotatably about a second support shaft, the first and second support shafts being disposed respectively on two reference planes substantially parallel to each other, the first driving shaft being disposed substantially perpendicularly to the reference planes, and the first support member being rotatable coaxially with the first driving shaft relative to the body frame.

The manufacturing apparatus of a fiber-reinforced resin strand according to the present invention is configured so that an offset angle of the first twisting roller can be adjusted by only rotating the first support member about the axis of the first driving shaft which is orthogonal to the first roller support shaft of the first twisting roller. Therefore, a mere rotation of the first support member about the axis of the first driving shaft is required for adjusting offset angles of the first and second twisting rollers. Thus, the roller offset angle adjusting operation for the first and second twisting rollers is simple and so is the configuration of the roller offset angle adjusting device itself. Accordingly, it is easy to reduce the size of the manufacturing apparatus of a fiber-reinforced resin strand.

More particularly, there may be adopted a configuration wherein the first support member is mounted to the body frame rotatably at a position opposite to the second twisting roller with the first twisting roller therebetween.

According to this configuration, the mounting position of the first support member relative to the body frame can be spaced away from the mating twisting roller (the second twisting roller), so that the rotating function of the first support member can be attained while minimizing the influence on the twisting work performed by both first and second twisting rollers.

In the manufacturing apparatus of a fiber-reinforced resin strand described above, there may be adopted a configuration wherein the second support member supports the second driving shaft so as to be rotatable coaxially with the first driving shaft in order to impart power to the second twisting roller, and is mounted to the body frame so as to be rotatable coaxially with the second driving shaft at a position opposite to the first twisting roller with the second twisting roller therebetween.

According to this manufacturing apparatus of a fiber-reinforced resin strand, an offset angle of the second twisting roller can be adjusted by only rotating the second support member about the axis of the second driving shaft which is orthogonal to the second support shaft of the second twisting roller. Therefore, the offset angle of the first twisting roller and that of the second twisting roller can be adjusted by merely rotating the first and second support members about the same axis. Accordingly, the roller offset angle adjusting work for the first and second twisting rollers can be done in a simple manner, and the configuration of the roller offset angle adjusting device is also simple, thus facilitating the reduction in size of the manufacturing apparatus of a fiber-reinforced resin strand.

The means adopted in the above manufacturing apparatus of a fiber-reinforced resin strand is characteristic in that, in the manufacturing apparatus of a fiber-reinforced resin strand, a rotational driving force is transmitted to at least one of the first and second driving shafts through a joint which permits adjusting the axial position of engagement with the at least one of the driving shafts.

According to this manufacturing apparatus of a fiber-reinforced resin strand, at least one of the first and second driving shafts is rotated through a joint which permits adjusting the axial position of engagement with the at least one of the driving shafts. Therefore, by moving the support member for supporting the driving shaft which is rotated through the joint toward the support member for supporting the other driving shaft, it is possible to adjust the roller spacing without moving such a drive system as a motor with reduction gear, that is, the roller spacing adjusting work is easy.

The means adopted in the above manufacturing apparatus of a fiber-reinforced resin strand is characterized in that the manufacturing apparatus of a fiber-reinforced resin strand further comprises pressing means for pressing the support member for supporting one of the driving shafts which is rotated through the joint toward the support member for supporting the other driving shaft.

According to this manufacturing apparatus of a fiber-reinforced resin strand, the support member for supporting one of the driving shafts which is rotated through the joint is pressed by the pressing means toward the support member for supporting the other driving shaft. Thus, all that is required for adjusting the pressing force against the strand in accordance with the hardness of strand and the strength of pultruding force is merely operating the pressing means, that is, the pressing force can be adjusted easily.

The means adopted in the above manufacturing apparatus of a fiber-reinforced resin strand is characterized in that the manufacturing apparatus of a fiber-reinforced resin strand further comprises a driving force transfer mechanism for transmitting a rotational driving force of a common drive source to the first and second driving shafts.

According to this manufacturing apparatus of a fiber-reinforced resin strand, both of the first and second driving shafts are driven by a driving force transfer mechanism which transmits the driving force of a single drive motor. Thus, it is not necessary to control to synchronize plural motors, and hence it is not necessary to adopt such an expensive motor as a servo motor.

INDUSTRIAL APPLICABILITY

The manufacturing apparatus of a fiber-reinforced resin strand according to the present invention is configured so that the offset angle of the first twisting roller can be adjusted by only rotating the first shaft • roller support member in the roller offset angle adjusting device around the axis of the first driving shaft which is orthogonal to the first roller support shaft of the first twisting roller. Therefore, the offset angle of the first twisting roller and that of the second twisting roller can be adjusted by only rotating the first shaft • roller support member about the axis of the first driving shaft. Accordingly, the offset angle adjustment for the first and second twisting rollers is simple and so is the configuration of the roller offset angle adjusting device itself, thus facilitating the reduction in size of the manufacturing apparatus of a fiber-reinforced resin strand.

The invention claimed is:

1. A manufacturing apparatus of a fiber-reinforced resin strand, having a first twisting roller and a second twisting roller, the first and second twisting rollers being provided in front of a crosshead and opposed to each other for twisting a fiber-reinforced resin strand drawn out from an exit nozzle of the crosshead, the apparatus comprising:
    a body frame;
    a first support member being mounted to said body frame rotatably, for supporting both a first support shaft for supporting the first twisting roller rotatably, and a first driving shaft being orthogonal to said first support shaft and functioning to impart power to the first twisting roller; and
    a second support member mounted to said body frame and supporting the second twisting roller rotatably about a second support shaft,
    said first and second support shafts being disposed respectively on two reference planes substantially parallel to each other, said first driving shaft being disposed substantially perpendicularly to said reference planes, and said first support member being rotatable coaxially with said first driving shaft relative to said body frame.

2. The apparatus according to claim 1, wherein said first support member is mounted to said body frame rotatably at a position opposite to the second twisting roller with the first twisting roller therebetween.

3. The apparatus according to claim 1, wherein said second support member supports a second driving shaft so as to be rotatable coaxially with said first driving shaft in order to impart power to the second twisting roller, and is mounted to said body frame so as to be rotatable coaxially with said second driving shaft at a position opposite to the first twisting roller with the second twisting roller therebetween.

4. The apparatus according to claim 3, wherein a rotational driving force is transmitted to at least one of said first and second driving shafts through a joint which permits adjusting the axial position of engagement with said at least one of said driving shafts.

5. The apparatus according to claim 4, further comprising pressing means for pressing said support member for supporting one of said driving shafts which is rotated through said joint toward said support member for supporting the other driving shaft.

6. The apparatus according to claim 3, further comprising a driving force transfer mechanism for transmitting a rotational driving force of a common drive source to said first and second driving shafts.

7. The apparatus according to claim 2, wherein said second support member supports a second driving shaft so as to be rotatable coaxially with said first driving shaft in order to impart power to the second twisting roller, and is mounted to said body frame so as to be rotatable coaxially with said second driving shaft at a position opposite to the first twisting roller with the second twisting roller therebetween.

8. The apparatus according to claim 4, further comprising a driving force transfer mechanism for transmitting a rotational driving force of a common drive source to said first and second driving shafts.

9. The apparatus according to claim 5, further comprising a driving force transfer mechanism for transmitting a rotational driving force of a common drive source to said first and second driving shafts.

10. The apparatus according to claim 7, further comprising a driving force transfer mechanism for transmitting a rotational driving force of a common drive source to said first and second driving shafts.

* * * * *